United States Patent [19]

Farquhar et al.

[11] 4,192,336

[45] Mar. 11, 1980

[54] NOISE SUPPRESSION REFRACTING INLET FOR JET ENGINES

[75] Inventors: Bannister W. Farquhar; Denis Sloan, both of Bellevue, Wash.

[73] Assignee: The Boeing Company, Seattle, Wash.

[21] Appl. No.: 644,893

[22] Filed: Dec. 29, 1975

[51] Int. Cl.² ............................................. F01N 11/00
[52] U.S. Cl. .................................... 137/15.1; 181/214
[58] Field of Search ............................ 137/15.1, 15.2; 181/214

[56] References Cited

PUBLICATIONS

NASA publication; SP-189; "Progress of NASA Research Relating to Noise Alleviation of Large Subsonic Jet Aircraft", Oct. 1968.

Primary Examiner—Alan Cohan
Attorney, Agent, or Firm—Christensen, O'Connor, Johnson & Kindness

[57] ABSTRACT

A noise-reducing jet engine air inlet duct contoured to control air flow such that sound waves (noise) propagating upstream from the engine toward the entryway of the air inlet duct are refracted to the duct wall and/or engine inlet centerbody is disclosed. The inlet duct wall and/or engine inlet centerbody are contoured to establish a cross-sectional duct region having substantial airflow velocity gradients in a direction transverse to the direction of the airflow. Starting at the inlet duct entryway, the contoured duct region includes a parallel or diverging section followed by a rapidly contracting section before a final diffusion section extending to the engine. The velocity gradients created in the region of the contracting section refract the sound waves toward the wall and/or engine centerbody of the air inlet duct. Embodiments in which the noise energy of the refracted sound waves is absorbed by suitable acoustic linings and embodiments in which noise reduction is achieved without the inclusion of acoustic linings are disclosed.

15 Claims, 3 Drawing Figures

NOISE SUPPRESSION REFRACTING INLET FOR JET ENGINES

BACKGROUND OF THE INVENTION

This invention relates to the suppression of noise emanating from a jet engine. More particularly this invention relates to the suppression of noise propagating forward through the air inlet duct of a jet engine.

The suppression of noise radiated by jet engines is a problem that has been receiving increasing attention, particularly within the past few decades. In this regard, noise limitations imposed by regulations and the like have often precluded operation at the most desirable power levels and have even curtailed aircraft operation in and around airports located in or near residential areas. One source of jet engine noise, commonly denoted as inlet noise, is due to sound waves propagating in the forward direction through the inlet duct of a jet engine. Inlet noise is due to a number of sources, such as high speed fan rotation in a turbofan engine and compressor operation.

Several prior art attempts have been made to reduce inlet noise. In the main, the prior art has concentrated on mounting sound-absorbing material on the air inlet duct wall or on the air inlet centerbody. Because of the limited duct wall area within most conventional jet engines, such prior art attempts have often required the addition of structural members such as annular rings or vanes supported in spaced relationship with the inlet duct wall to increase the surface area upon which acoustically absorbent material can be applied or mounted—see "Progress of NASA Research Relating to Noise Alleviation of Large Subsonic Jet Aircraft," NASA report SP-189, 1968, paper #9, "Design Concepts" by Robert E. Pendley.

Another prior art attempt to eliminate or reduce air inlet duct noise is discussed in U.S. Pat. No. 3,692,141 issued to Labussiere et al. Labussiere discloses an inlet duct that includes an acoustically reflective centerbody. The centerbody is shaped to reflect inlet noise toward localized areas of the outer duct wall that are treated with acoustically absorbent linings.

The prior art, although successful to a certain extent, has failed to suppress inlet noise to the desired level. Further the prior art, because of added structural elements such as concentric rings mounted in the interior of the inlet duct, has often imposed unacceptable performance penalties due to added weight and/or restricted engine airflow. For example, the air inlet disclosed by Laboussiere et al not only imposes a weight penalty, but the bulbous centerbody necessary to form a parabolic acoustic reflector tends to impede efficient airflow through the engine inlet duct. Further, since the reflection angles appear to be strong functions of the fluid media, e.g. the density and velocity of the air flowing through the inlet duct, the noise suppression efficiency of this device will vary widely with certain engine parameters, such as turbine speed.

Accordingly it is an object of this invention to provide an inlet duct for a jet engine that significantly suppresses inlet noise without creating any undue detrimental effect on the operation of the engine.

Further, it is an object of this invention to realize jet engine inlet duct structure which is configured to reduce inlet noise without requiring the addition of noise-reducing elements.

SUMMARY OF THE INVENTION

The foregoing and other objects are achieved in accordance with this invention by contouring the walls of an air inlet duct so as to produce a cross-sectional area having substantial airflow velocity gradients in a direction transverse to the direction in which the inlet noise (sound waves) is traveling. Starting at the inlet duct entryway, the contour includes a parallel or diverging section followed by a rapidly contracting section before a final diffusion section extending to the engine. The velocity gradients created in the region of the contracting section refract the sound waves toward the wall of the inlet duct and the engine centerbody (if one is included).

In certain preferred embodiments of this invention the inlet duct wall and/or centerbody are lined in the region of sound wave impingement with an acoustic lining that absorbs the energy of the refracted or redirected sound waves. In certain other preferred embodiments noise suppression is achieved without the use of an acoustic lining by the partial absorption of the acoustic energy by the inlet duct wall and by the scattering of the sound waves that occurs when the waves reflected by the inlet duct wall (or engine centerbody) interact with refracted waves that have not yet intersected the inlet duct wall.

BRIEF DESCRIPTION OF THE DRAWING

Other objects and advantages of the present invention will become apparent to one skilled in the art after a reading of the following description taken together with the accompanying drawing, in which.

DESCRIPTION OF THE PREFERRED EMBODIMENTS

Figure 1:
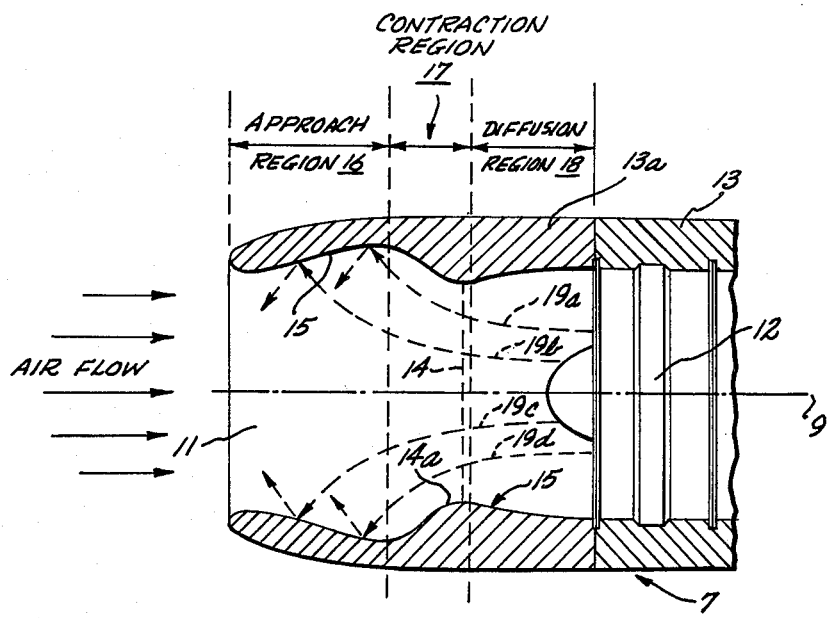
FIG. 1 diagramatically depicts an air inlet duct illustrating one embodiment of this invention.

FIG. 1 illustrates a section of a jet propulsion engine, including an air inlet duct 11 structured in accordance with this invention. In FIG. 1, the air inlet duct 11 is located in front of a jet engine assembly 7 including, for example, a turbofan engine 12 housed in a fan cowl 13. The wall 15 of the air inlet duct 11 is generally defined by a portion 13a of the fan cowl 13 that extends forward of the turbofan engine 12. This portion 13a of the fan cowl 13 may be contiguous with the remainder of the fan cowl or may be a separate structure joined to the overall engine assembly by any suitable means such as bolts, for example. As will be understood by those skilled in the art, the engine assembly 7 may take various forms other than the turbofan engine 12 and cowl 13 illustrated in FIG. 1. For example, in a jet engine not equipped with a turbofan, the compressor unit of an engine structure may be directly affixed to the outlet of the air inlet duct 11. In any case, the air inlet duct of this invention usually has a circular or ellipsoidal cross sectional shape and directs air into the engine.

As can be readily observed in FIG. 1, the wall 15 of the air inlet duct 11 is contoured in a novel fashion. In fact, the inlet duct wall 15 exhibits three distinct regions of generally different contour. Starting at the entryway of the air inlet duct 11, the first contour region, denoted as an approach region 16 in FIG. 1, defines a length of inlet duct 11 in which the duct wall 15 is slightly diverging with respect to the axial centerline 9 of the engine assembly 7. As an alternative to divergence, the wall in this region may be parallel to the axial centerline of the engine assembly 7.

The second contour region, denoted as a contraction region 17 in FIG. 1, defines a relatively short length of inlet duct 11 in which the duct wall 15 rapidly contracts toward the axial centerline 9. This region forms a constriction to the air flow. As denoted in FIG. 1 by orthogonal dashed line 14 an area of minimum duct cross section or a throat 14a, is formed at the point of least duct wall separation. The third contour region, denoted as a diffusion region 18 in FIG. 1, defines a second length of the inlet duct in which the duct wall 15 is generally diverging until it intersects the inlet to the turbofan engine 12.

Although each of the three regions of the inlet duct 11 has a generally different contour, the composite duct wall forms an aerodynamic surface that does not cause flow separation. An important factor to realize is that the wall contour is such that mass flow gradients are established in the air flowing through inlet duct 11 at the location of the contraction region 17. The mass flow velocity gradients are sufficient to refract sound waves (inlet noise acoustic engergy) toward the duct wall 15 so that a substantial portion of the wave fronts impinge on the wall of the approach region 16 and the contraction region 17.

Figure 2:
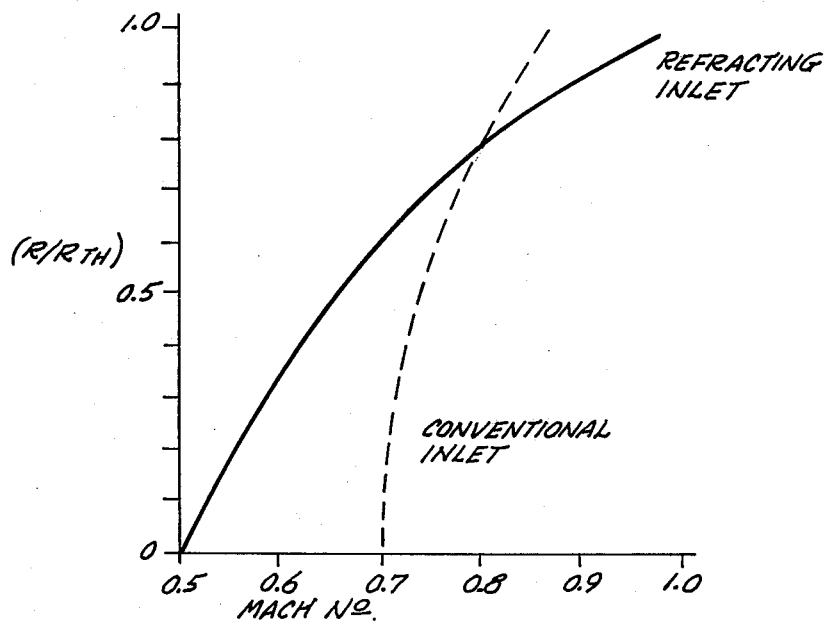
FIG. 2 graphically depicts the velocity gradient typically established at the throat region of an inlet duct constructed in accordance with the embodiment of the invention illustrated in FIG. 1 and further depicts a typical velocity gradient formed within a conventional jet engine lacking the present invention.

By examining the structure of FIG. 1 those skilled in the air and others will realize that the velocity of the air mass flowing through the contraction region 17 of inlet duct 11 will vary as a function of the transverse distance from the duct wall 15, with the portion of the air mass adjacent to the duct wall in the vicinity of the throat 14a traveling at a substantially higher velocity than the portions of the air mass located closer to the axial centerline 9 of the engine assembly 7. FIG. 2 depicts the velocity gradient at the throat 14a in one realization of the embodiment of the invention illustrated in FIG. 1, where the inlet duct is of substantially circular cross section. In FIG. 2 the velocity of the air mass is illustrated on the abscissa and is referenced to the speed of sound, i.e. the velocity is denoted in Mach number. The ordinate denotes the decimal fraction $R/R_{th}$ where R is a chosen radial value along the dashed line 14 taken at the throat 14a and $R_{th}$ is the radius of the throat 14a. To better illustrate the advantages of this invention, the velocity gradient formed within the inlet duct of a conventional jet engine not equipped with this invention is illustrated in FIG. 2 by a dashed line and the velocity gradient formed within an inlet formed in accordance with the invention is illustrated by a solid line. By comparing these two velocity gradients it can be appreciated that a substantially higher velocity gradient is established by the present invention at the throat 14a of contraction region 14.

Since the air mass flow velocity is relatively uniform within the diffusion region 18 of the inlet duct 11, the sound waves (represented by arrows 19a, 19b, 19c and 19d in FIG. 1) propagate away from the engine assembly in a manner similar to that which would be experienced within a conventional inlet duct until they reach the throat 14a. Upon reaching the throat 14a, however, the sound waves encounter the mass flow velocity gradients established by the contraction region 17. These velocity gradients refract a substantial portion of the waves toward the duct wall 15. The noise energy of the refracted sound waves impinges on the duct wall 15 in both the contraction region 17 and the approach region 16. The duct wall 15 absorbs a portion of this noise energy and reflects the remaining portion. The reflected portion of the energy causes scattering of the sound wave front traveling through duct 11 thereby providing additional noise suppression.

Assuming an inlet duct 11 of generally circular cross section, it has been found that a velocity gradient that achieves the desired refraction of sound waves will be established if the dimensional relationships of inlet 11 are maintained within the following ranges:

$0.8 < D_{th}/D_{ff} < 1.0$
$1.2 < D_u/D_{th} < 1.6$
$0.2 < L_c/D_{th} < 0.5$
$0.2 < L_a/D_{th} < 1.5$

Where:

$D_{th}$ is the effective diameter of the throat 14a;

$D_{ff}$ is the effective diameter of the inlet to the turbofan engine 12, i.e., the diameter at the outlet orifice of the diffusion region 18;

$D_u$ is the effective diameter at the boundary between the approach region 16 and the contraction region 17 (thus $D_u$ is generally the effective diameter of the largest cross-sectional area within inlet duct 11);

$L_c$ is the length of the contraction region 17; and, $L_a$ is the length of the approach region 16.

It should be realized that any internal contouring of the duct wall 15 that establishes a velocity gradient sufficient to refract sound waves to the inlet walls is satisfactory and, thus, falls within the scope of the present invention. Such contouring should, of course, establish the required velocity gradient while simultaneously providing airflow adequate to ensure proper engine operation.

Figure 3:
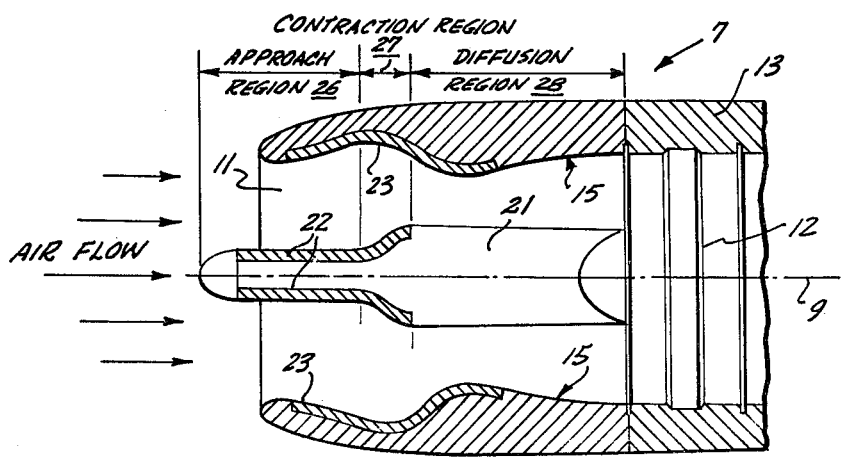
FIG. 3 illustrates an embodiment of this invention that includes acoustic lining positioned on the inlet duct wall so as to absorb the refracted sound waves and further includes an acoustically-lined centerbody configured to refract and absorb inlet noise.

FIG. 3 depicts an embodiment of this invention that includes a sound-absorbing lining 23 in the duct wall 15 in the approach region 16 and the contraction region 17. The sound absorbing lining is formed of any one of several well-known materials adapted to absorb acoustic energy, as discussed more fully hereinafter. FIG. 3 also depicts an acoustically lined engine centerbody 21 contoured in accordance with this invention to effect noise suppression by refraction of the sound waves. It should be understood that the combination of a refracting centerbody 21 and a refracting duct wall 15, is shown in FIG. 3 simply for convenience. That is, in the practice of this invention, as illustrated in FIG. 1, an appropriately contoured duct wall 15 with or without an acoustically absorbing lining may be employed with or without a refracting centerbody structure. In a like manner, an acoustically refracting centerbody with or without an acoustic lining may be employed in an air inlet having a conventionally contoured duct wall.

The refracting centerbody 21 illustrated in FIG. 3 is an elongated body of generally circular cross section and is mounted along the axial centerline 9 of the air inlet duct 11 of the engine assembly 7. As conventional, the centerbody is attached to the center hub of the turbofan engine 12. As depicted, the end of the centerbody 21 impacted by the incoming airflow is generally rounded to present an aerodynamically smooth surface to the airflow. The refracting centerbody 21 is contoured in a manner similar to the contour of the duct wall 15 of FIG. 1. Thus, the refractng centerbody includes an approach region 26 that is of relatively uniform cross-sectional area or of a variable cross-sectional area that gradually changes along the axial centerline 9 in the direction of the airflow.

The approach region 26 is followed by a contraction region 27. In the contraction region, the cross-sectional area is smoothly but rather rapidly increased in the direction of the airflow. Considering only the effect of the refracting centerbody 21, it will be recognized by those skilled in the art that the velocity gradient established by the contraction region 27 of the refracting centerbody 21 is such that the portion of the intake air in close proximity to that portion of the surface of the refracting centerbody which exhibits substantially greater diameter than the approach region 22 within the contraction region 27 flows at a substantially higher velocity than do the portions of the air that are further away from the surface of contraction region 27. Accordingly, noise energy contained in sound waves traveling against the direction of the airflow, in the vicinity of centerbody 21, is refracted toward the surface of the refracting centerbody.

The contraction region is followed by a diffusion region 28. The diffusion region 28 is formed by that portion of the refracting centerbody 21 extending between the contraction region 27 and the turbofan engine 12 and has a cross-sectional area that decreases from the contraction region toward the engine. The rate of cross-sectional decrease in the diffusion region is substantially lower than the rate of cross-sectional area increase in the contraction region 27.

As in the contouring of the duct wall 15 in the embodiment of FIG. 1, the various contours of the refracting centerbody 21 are established such that appreciable air flow separation does not occur at the surface of the centerbody. As with the contoured duct wall embodiment, the prime consideration in the configuration of each physical realization of the refracting centerbody 21 is that the difference in the cross sectional area between approach region 26 and contraction region 27 be made sufficiently large enough to establish an airflow velocity gradient that will refract a substantial portion of the inlet sound waves, thereby causing the noise energy in the waves to impinge on the centerbody surface.

In an embodiment of the invention utilizing both a refracting duct wall 15 and a refracting centerbody 21, various and relatively complex cross-sectional velocity gradient patterns can be established at various positions along the length of the inlet duct 11. More specifically, since both the contraction region 17 of the duct wall 15 and the contraction region 27 of the centerbody 21 are configured to establish relatively high mass-flow velocity along the respective contraction region to refract noise energy for impingement on the surface of the duct wall 15 and the surface of the centerbody 21, various velocity patterns result within the interior region between the surface of the centerbody 21 and the duct wall 15. The exact velocities within this region are dependent not only on the magnitude of the surface velocities established by the contraction regions 17 and 27, but also depend on the axial position of the centerbody contraction region 27 relative to the duct wall contraction region 17. The important thing to realize is that the duct wall contraction region 17 of such an embodiment is generally contoured for refracting noise energy that propagates forwardly through the outer region of the annular air flow duct for impingement on forwardly located regions of the duct wall 15 (i.e., forward portions of the contraction region 17 and the duct wall approach region 16), whereas the centerbody contraction region 27 is configured for refracting noise energy that propagates along the central region of the annular air flow duct for impingement on forwardly located regions of the centerbody 21 (i.e., forward portions of the contraction region 27 and the centerbody approach region 22).

As depicted in FIG. 3, the refracting centerbody 21 may include a surface layer or acoustic lining 22 covering the periphery of the centerbody in the approach and contraction regions. Acoustic lining 22 may be any suitable material that is acoustically absorbent, i.e. a material that dissipates a substantial portion of the energy of impinging acoustic waves. Acoustic absorbing materials that are suitable for utilization within the inlet duct of a jet propulsion engine are well known in the art.

As noted above, another acoustic lining 23 is depicted in FIG. 3 in approach region 16 and contraction region 17 of the contoured duct wall 15 of inlet duct 11. The inclusion of this acoustic lining 23 allows the duct wall to absorb a substantially larger portion of the impinging refracted acoustic energy, when compared with a non-acoustically treated duct wall 15 (FIG. 1). In one realization of this invention that utilizes a refractive contoured duct wall without refracting centerbody 21, it was observed that approximately 5 to 15 decibels of additional noise suppression was achieved by utilizing acoustic lining 23 in the approach region 16 and the contraction region 17 of the inlet duct 11. Accordingly it will be realized that in the practice of this invention embodiments including acoustic linings such as linings 22 and 23 will be advantageously employed where it is necessary or desirable to obtain maximum noise suppression. Further, it will be realized that the use of certain commercially available acoustically absorbent materials may result in a noise suppression improvement greater than the 5 to 15 decibels of the aforementioned realization of this invention.

It will be noted from viewing FIG. 3 that, when acoustic linings 22 and 23 are employed, the wall of the inlet 11 and the surface of centerbody 21 will be undercut by the amount necessary for the outer surface of the lining to form the desired contour. In addition, a protective layer (not shown in FIG. 3), that permits passage of the noise energy to the lining may be employed to cover the acoustic linings 22 and 23. Such protective layers are well-known in the art and may comprise, for example, a thin steel sheet perforated by a large number of holes.

With respect to all embodiments of this invention, it has been determined that significant inlet noise suppression is achieved at air flow levels having a subsonic mean throat velocity of approximately Mach 0.7 or greater. Further it has been determined that in the practice of this invention the most significant reduction in inlet noise is attained if the ratio of the wave length of the noise frequency to the mean inlet diameter is made less than approximately 0.5.

It will be recognized by those skilled in the art that various modifications may be made in the embodiments herein discussed without departing from the scope and spirit of this invention. For example, although the disclosed embodiments are generally described as having a circular or ellipsoidal cross section, suitably shaped refracting wall and centerbody arrangements for use in inlet ducts of other cross-sectional configurations will be obvious to the artisan, e.g., inlet ducts of generally rectangular cross section.

What is claimed is:

1. In an air inlet duct suitable for directing airflow to the inlet of a jet engine wherein said air inlet duct includes an entrance opening and a flow passage extending from said entrance opening for directing said airflow to said jet engine inlet, the improvement comprising means for establishing a velocity gradient in said airflow relative to the direction substantially transverse to the direction of aid airflow, said means for establishing said velocity gradient being located along a predetermined portion of said flow passage at a position downstream of said entrance opening, said velocity gradient being characterized in that sound waves traveling through said flow passage of said duct in a direction opposed to the direction of said airflow are refracted by an amount sufficient to impinge said sound waves on said means for establishing said velocity gradient.

2. The improvement claimed in claim 1 wherein said means for establishing said velocity gradient includes a contraction region formed in the wall of said inlet duct at said position downstream of said entrance opening, said contraction region establishing a decreasing cross-sectional area in said flow passage with respect to the direction of said airflow.

3. The improvement claimed in claim 2 further comprising an acoustically absorbent lining mounted on said duct wall in the region on which said refracted sound waves impinge.

4. The improvement claimed in claim 1 wherein said means for establishing said velocity gradient includes an air inlet centerbody of predetermined length mounted coaxially within said duct and having a contraction region formed in its outer surface along a predetermined portion of its length, said contracting region established by an increasing cross-sectional centerbody area with respect to the direction of said air flow.

5. The improvement claimed in claim 4 further comprising a layer of acoustically absorbent lining mounted on the periphery of said centerbody in the region on which said sound waves impinge.

6. A jet engine inlet duct for directing air from an inlet located on one end of said duct toward an outlet located at the other end of said duct and reducing the level of acoustic noise energy propagating from said outlet end toward said inlet end, said air inlet duct comprising, starting at said inlet end:
an approach region for receiving air at said inlet end and directing it generally toward said outlet end;
a contraction region contiguous to said approach region for receiving air from said approach region and directing it toward said outlet end, the cross-sectional area of said contraction region decreasing in the direction of flow so as to form a throat, said decrease in cross-sectional area controlling the velocity of airflow through said air inlet duct in a manner such that velocity gradients are formed at said throat relative to a direction that is transverse to the direction in which said air is directed toward said outlet end, said velocity gradients refracting acoustic noise energy, propagating through said air inlet duct from said outlet end to said inlet end, to redirect said noise energy toward forwardly located regions of the wall of said air inlet duct, said redirection of said acoustic noise energy being of an amount sufficient to cause impingement of said redirected acoustic noise energy on said forwardly located regions of said air inlet wall; and,
a diffusion region contiguous to said contraction region on the end thereof remote from said approach region for directing air from said approach region to the outlet end of said air inlet duct.

7. The jet engine air inlet duct of claim 6 including an acoustically absorbent lining mounted in said approach and contraction regions of said air inlet duct for absorbing refracted acoustic noise energy impinging on the interior wall of said air inlet duct.

8. The jet engine air inlet duct of claim 6 further comprising:
a centerbody of predetermined length extending coaxially along the longitudinal axis of said inlet duct, the end of said centerbody impacted by air entering said inlet end of said air inlet duct having an aerodynamically smooth surface, said centerbody including:
a first region of relatively constant cross-sectional area;
a second region of increasing cross-sectional area, in the direction of airflow, said second centerbody region being located downstream of said first centerbody region relative to the direction of said airflow; and,
a third region of decreasing cross-sectional area, in the direction of said airflow, said third region being located downstream from said second region relative to the direction of said airflow, said increasing cross-sectional area of said second region controlling the velocity of said airflow through said duct so as to establish a velocity gradient transverse to said airflow, said velocity gradient refracting noise energy traveling in a direction opposed to said airflow to redirect a substantial portion of said noise energy for impingement on the surface of said first and second regions.

9. The jet engine air inlet duct of claim 8 wherein the interior cross section of said approach, contraction and diffusion regions are substantially circular.

10. The jet engine air inlet duct of claim 9 wherein:
the ratio of the diameter of said throat to the diameter of said air inlet duct at said outlet end is less than 1.0 and greater than 0.8;
the ratio of the diameter of the end of said contraction region contiguous to said approach region, to the diameter of said throat, is less than 1.6 and greater than 1.2;
the ratio of the length of said contraction region to the diameter of said throat is less than 0.5 and greater than 0.2; and,
the ratio of the length of said approach region to the diameter of said throat is less than 1.5 and greater than 0.2.

11. The jet engine air inlet duct of claim 6 wherein the cross-sectional area of said air inlet duct in said approach region increases in the direction of said air flow.

12. The jet engine air inlet duct of claim 11 wherein the cross-sectional area said approach, contraction and diffusion regions are substantially circular.

13. The jet engine air inlet of claim 12 wherein:

the ratio of the diameter of said throat to the diameter of said air inlet duct at said outlet end is less than 1.0 and greater than 0.8;

the ratio of the diameter of the end of said contraction region contiguous to said approach region, to the diameter of said throat, is less than 1.6 and greater than 1.2;

the ratio of the length of said contraction region to the diameter of said throat is less than 0.5 and greater than 0.2; and, the ratio of the length of said approach region to the diameter of said throat is less than 1.5 and greater than 0.2.

14. A noise reducing inlet duct for a jet engine comprising:

an inlet duct including an open end and an open outlet end for directing airflow toward the inlet of a jet engine; and a centerbody of predetermined length extending coaxially along the longitudinal axis of said inlet duct, the end of said centerbody impacted by said airflow having an aerodynamically smooth surface, said centerbody including:

a first region of relatively constant cross-sectional area;

a second region of increasing cross-sectional area, in the direction of said airflow, said second centerbody region being located downstream of said first centerbody region relative to the direction of said airflow; and, a third region of decreasing cross-sectional area, in the direction of said airflow, said third region being located downstream from said second region relative to the direction of said airflow, said increasing cross-sectional area of said second region controlling the velocity of said airflow through said duct so as to establish a velocity gradient transverse to said airflow, said velocity gradient refracting noise energy traveling in a direction opposed to said airflow toward the surface of said centerbody, said redirection of said noise energy being of an amount sufficient for impingement of a substantial portion of said redirected noise energy on the surface of said first and second regions.

15. The noise reducing inlet duct of claim 14 further comprising a layer of acoustically absorbent material mounted on the surface of said centerbody in said first and second regions.

* * * * *

UNITED STATES PATENT AND TRADEMARK OFFICE
CERTIFICATE OF CORRECTION

PATENT NO. : 4,192,336
DATED : March 11, 1980
INVENTOR(S) : Farquhar et al.

It is certified that error appears in the above-identified patent and that said Letters Patent are hereby corrected as shown below:

Column 3, line 34: "engergy" is changed to --energy--.

Column 3, line 39: "air" first occurrence is changed to -- art --.

Column 7, line 17: "aid" is changed to --said--.

Signed and Sealed this

Twenty-ninth Day of July 1980

[SEAL]

Attest:

SIDNEY A. DIAMOND

Attesting Officer

Commissioner of Patents and Trademarks